UNITED STATES PATENT OFFICE.

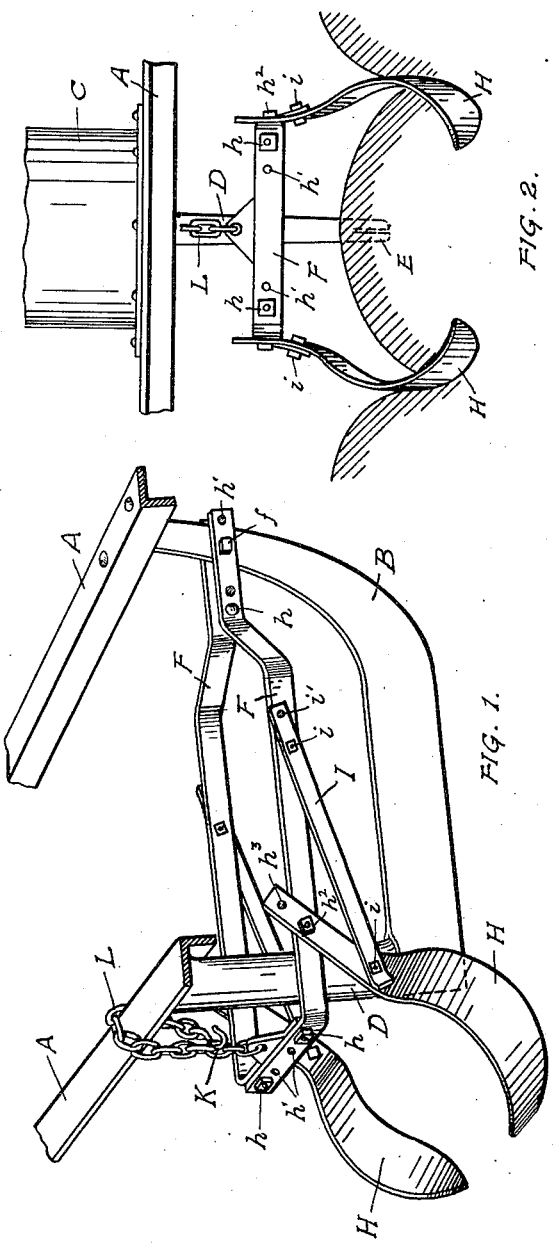

THOMAS F. PAYNE, OF NODAWAY COUNTY, MISSOURI.

CORN-COVERER.

1,030,244.　　　　　Specification of Letters Patent.　　Patented June 18, 1912.

Application filed February 5, 1912. Serial No. 675,476.

*To all whom it may concern:*

Be it known that I, THOMAS F. PAYNE, a citizen of the United States of America, residing in the county of Nodaway and State of Missouri, have invented certain new and useful Improvements in Corn-Coverers, of which the following is a specification.

In the ordinary way of planting corn the grains are dropped on the hard ground at the bottom of the furrow made in turning up the sub-soil: the sprouting and growth of the corn is thereby retarded through lack of having a proper seed bed in which to germinate.

The object of my invention is to provide a device whereby the seed corn is dropped on the top of the loosened sub-soil and the subsoil dirt on either side is drawn toward and ridged over the seed thereby forming a perfect seed bed and insuring quick germination of the grains.

I accomplish my object by the mechanism illustrated in the accompanying drawings in which—

Figure 1 is a perspective of my corn coverer shown attached to one of the runners of a corn planter, the connecting frame pieces for an opposite runner and coverer broken away, and Fig. 2 is a front view of the same showing the grain receptacle broken away.

Similar letters on the drawing and in the specification refer to similar parts, A representing one side of the frame of an ordinary corn planter and B one of the planter runners attached thereto.

C is a corn receptacle or supply box, shown in Fig. 2 broken away.

D is a hollow upright to convey the seed corn from the grain receptacle to heel E, from which heel the corn drops on the top of the subsoil dirt.

F is the frame of the corn coverer; it is pivotally connected to the front of each corn planter runner by a bolt and nut $f$. As shown in Fig. 1 the frame of the corn coverer is cast in sections and held together adjustably by bolts and nuts $h$ $h$— through a plurality of holes $h'$ $h'$— to permit its adjustment in either width or length or both.

H H are the corn coverer knives which are removably and adjustably attached to the sides of the corn coverer by bolts and nuts $h^2$ $h^2$ through holes $h^3$ $h^3$. These knives are preferably set at an angle of about forty-five degrees, as shown in Fig. 1, and each knife is held rigid by means of a brace I connected at its bottom end by bolt and nut $i$ near the top of the blade of the knife and at its top end with the coverer frame by similar bolt and nut $i$; it is also provided with holes $i'$ $i'$ to allow for adjustment.

It will be understood from the foregoing description that the knives are not only adjustable but may be readily removed to permit them to be sharpened or to allow them to be replaced with others. Said knives are curved as shown in the drawings and by reason of said curvature and their adjustment on the planter as the grains drop on loose soil from the heel of the planter the knives drag the soil toward each other into a ridge over the grains.

From the foregoing it will be seen that the knives make furrows or ditches on each side of the row of corn instead of the corn being planted in a furrow or ditch; if the corn is planted on a hillside the danger of being washed out by heavy rains is thus obviated; if planted on level low ground the danger of the grains rotting in the ditch or furrow after heavy rains is likewise obviated.

L is a chain one end of which is looped over any convenient part of the corn planter frame and attached at its other end to the rear of the frame of the corn coverer, one link of the chain forming a hook K to engage with one of the other links of the chain in order to quickly elevate or lower the knives and support them at the desired height.

What I claim and desire to secure by Letters Patent is,—

1. A corn coverer comprising a frame composed of sections united by bolts said frame being thereby rendered adjustable in width, curved soil cutting and dragging knives their handle ends connected by bolts adjustably to the rear part of the sides of the frame, said knives being adapted to cut into and drag the soil toward each other forming a single ridge below the frame on a line central between the sides thereof.

2. In a corn coverer the combination with a corn planter, of a frame its front end pivotally connected therewith and curved knives adjustable in height connected with the sides of the coverer frame bearing toward each other downwardly and rearwardly to a horizontal plane that is below said runners.

3. In a corn coverer the combination with the frame, heel and runners of a corn planter, of a coverer frame pivotally connected at its front end to a runner of the corn planter, opposite curved knives set at an angle on either side of the heel of the corn planter on a plane slightly below a horizontal with the bottom of said heel and fastened adjustably to the sides of the corn coverer frame, braces to hold said knives in rigid position on the coverer frame, and a chain looped at one end over the corn planter frame, the other end fastened to the rear of the corn coverer frame, having a hook to engage with a link of the chain to regulate the cutting depth of the knives.

4. In a corn coverer the combination with a corn planter runner, of an adjustable frame constructed in sections and pivotally attached at the front to the front of said runner, knives with handle ends attached to the sides of the frame near the rear thereof the blades curved outwardly from each other in the body portion and inwardly toward each other at their ends, said knives bearing rearward from top to bottom the blades thereof extending rearward of and below the horizontal plane of the bottom of the runner.

In testimony whereof I affix my signature in presence of two witnesses.

THOMAS F. PAYNE.

Witnesses:
JOHN BLACKBURN,
JOHN BURNS.

---

Copies of this patent may be obtained for five cents each, by addressing the "Commissioner of Patents, Washington, D. C."